United States Patent [19]

Lin et al.

[11] Patent Number: 4,979,460
[45] Date of Patent: Dec. 25, 1990

[54] ROTATION INDICATOR MOUNTED ON STEERING WHEEL

[76] Inventors: Mei-Hwa Lin; Ai-Ing Lee, both of 3FL, 33 Lane, 42 Tung Kwang Road, Hsin Chu City, Taiwan

[21] Appl. No.: 406,605

[22] Filed: Sep. 12, 1989

[51] Int. Cl.$^5$ .............................................. B60Q 9/00
[52] U.S. Cl. ...................................... 116/31; 116/303
[58] Field of Search .......................... 33/354, 365, 391;
40/591, 593; 116/31, 215, 282, 295, 298, 303

[56] References Cited

U.S. PATENT DOCUMENTS

| | | | |
|---|---|---|---|
| 2,579,233 | 12/1951 | Hiatt | 116/31 |
| 2,957,442 | 10/1960 | Coon | 116/31 |
| 3,569,932 | 3/1971 | Reed, Jr. | 116/31 |
| 3,673,561 | 6/1972 | Bronstein | 340/52 R |
| 4,013,034 | 3/1977 | Cantley et al. | 116/31 |
| 4,157,076 | 6/1979 | Roth et al. | 116/215 |

FOREIGN PATENT DOCUMENTS 15795  4/1904  Austria ................................. 116/31

*Primary Examiner*—William A. Cuchlinski, Jr.
*Assistant Examiner*—W. Morris Worth
*Attorney, Agent, or Firm*—Cushman, Darby & Cushman

[57] ABSTRACT

An indicator unit which can be fixed on a tilted steering wheel for indicating the turn condition of the wheel. The indicator mainly includes a base member secured to the wheel, a bias-weighted member pivotally mounted on the base member to maintain itself in an upright position during rotation of the base member with that wheel, a ball-shaped member laid between the base member and the bias-weighted member, constrained by a spiral groove and a radial slot separately furnished on the two members so that the relative rotation between the two members causes the ball-shaped member to move along the radial slot of the bias-weighted member, and a pointed member pivoted on the bias-weighted member and having a curved slot which crosses the ball-shaped member so as to convert the radial movement of the ball-shaped member into swing motion of the pointer member, thus indicating the corresponding turning direction of the car wheel relative to the turning of the steering wheel.

4 Claims, 3 Drawing Sheets

ROTATION INDICATOR MOUNTED ON STEERING WHEEL

BACKGROUND OF THE INVENTION

1. Field of the Invention

The present invention relates to an indicating device mounted on a rotatable wheel for indicating the rotation of the wheel. The typical application of the device is as an indicator attached to the steering wheel of a car or a boat to show the turned direction of the car wheel or the rudder of the boat.

2. Description of the Related Art

U.S. Pat. No. 2,957,442 discloses an indicator settled at an off-steering wheel position where a cable transmits actuating motion to the indicator from a sector shaft connected with the steering shaft. Such an arrangement is unnecessarily complicated.

In U.S. Pat. No. 3,673,561 an indicator is disclosed which has gears which transmit rotation of the steering shaft to operate two variable resistance means that actuate an indicating meter and two lights. Such a device requires an electric power supply and the mounting of the gears is bothersome.

A device mainly including a planetary gear train mounted between a steering shaft and a bulkhead where the shaft rotatably passes through is disclosed in U.S. Pat. No. 4,013,034. A pinion (sun) gear is fixedly mounted on the shaft, and a hub furnished with an inner ring gear surrounds the pinion gear and is fixed to the bulkhead. A disc carrying an idler (planet) gear which meshes with the pinion gear, and the ring gear, gets a differential rotation corresponding to the rotation of the steering shaft relative to the hub. The fact that this device should be mounted around the shaft and occupies a space between the steering wheel and the bulkhead limits its application.

An ideal device would have a simple structure as an unit and could be built-in or attached on the steering wheel. This feature is taught in U.S. Pat. No. 3,569,932 and U.S. Pat. No. 4,157,076. Such indicators utilize a member having one or two spiral paths thereon secured to the steering wheel and a gravity-responsive member freely moving along the path(s) to show the rotation of the steering wheel by the particular position of the gravity-responsive member on that path. These indicators are not easy to read since they fail to provide a pointer means that directly indicates the left and right rotation, therefore making reading more difficult.

SUMMARY OF THE INVENTION

Therefore, the primary object of the present invention is to provide a rotation indicator having simple structure as an unit which can be built-in or attached to a steering wheel.

A further object of the present invention is to provide a rotation indicator which contains pointer means for showing the left and right rotation of the wheel relative to the turned direction of the car wheels.

Another object of the present invention is to provide a rotation indicator that comprises a gravity-responsive member which rotates to remain downward on a base member that is fixed to the steering wheel, and a pointer member moves left and right relative to the gravity-responsive member.

In this invention, a flat base member furnished with a spiral groove is fixed to a steering wheel, and a bias-weighted (gravity-responsive) member is pivotally mounted on the base member at the center of its spiral groove. A radial groove is furnished on the bias-weighted member at one side thereof facing the groove of the base member so that a ball-shaped member constrained in the cavity formed by the radial groove and the spiral groove is movable along the radial groove when relative rotation between the two members occurs. A pointer member laid between the bias-weighted member and the base member is formed with a pointer portion, a cam portion and a central hole by which the pointer member is pivoted coaxially with the bias-weighted member to the base member. The cam portion of the pointer member is furnished with a curved slot that crosses the ball-shaped member so as to convert the radial movement of the ball-shaped member to the swing of the pointer member that can be read from the pointer portion with respect to a scale furnished on the bias-weighted member as left-right pointing.

Other objects, features and characteristics of the present invention as well as the methods of operation and the functions of the related elements will become apparent upon consideration of the following description and the appended claims with reference to the accompanying drawings, all of which form a part of this specification, wherein like reference numerals designate corresponding parts in the various figures.

DETAILED DESCRIPTION OF THE OF THE PRESENTLY PREFERRED EXEMPLARY EMBODIMENT

Figure 1:
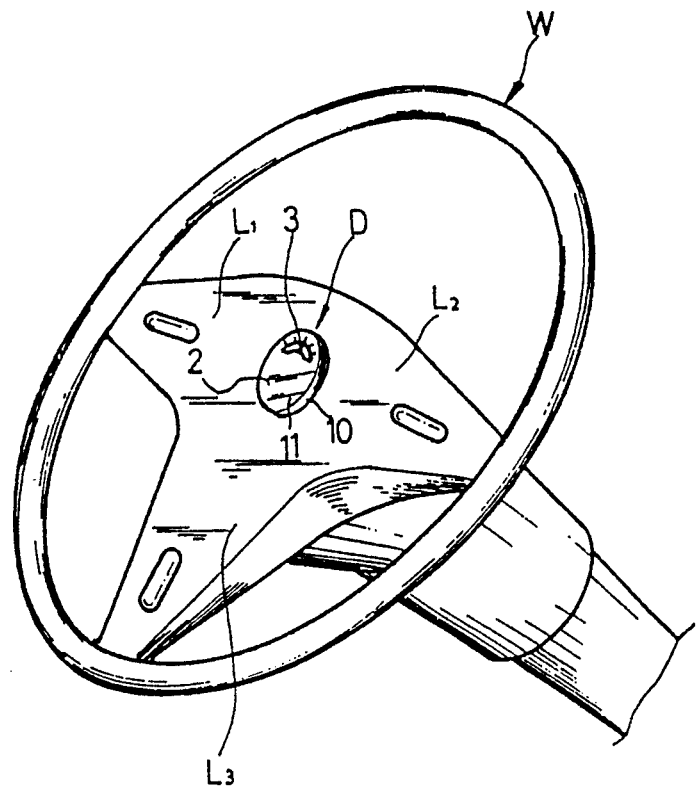
FIG. 1 is a perspective view showing the indicator of the present invention attached to a steering wheel.

FIG. 1 shows the indicator D of the present invention installed in the central part of a steering wheel W for easy reading during rotation of the steering wheel, though the indicator may be installed at any position on the steering wheel such as $L_1$, $L_2$ or $L_3$ as designated. The indicator D is formed into a thin piece, which includes a base 10 coupled with a transparent cover 11 and fixedly mounted on steering wheel W by being built-in, adhered or screwed to the steering wheel. A bias-weighted member 2 rotates on the center of the base member 1 by gravity, since the steering wheel W is on a tilt, to maintain its downward position, whereby a pointer member 3 swings relative to the bias-weighted member 2 to indicate the left and right direction corresponding to the turning of the car wheels.

Figure 2:
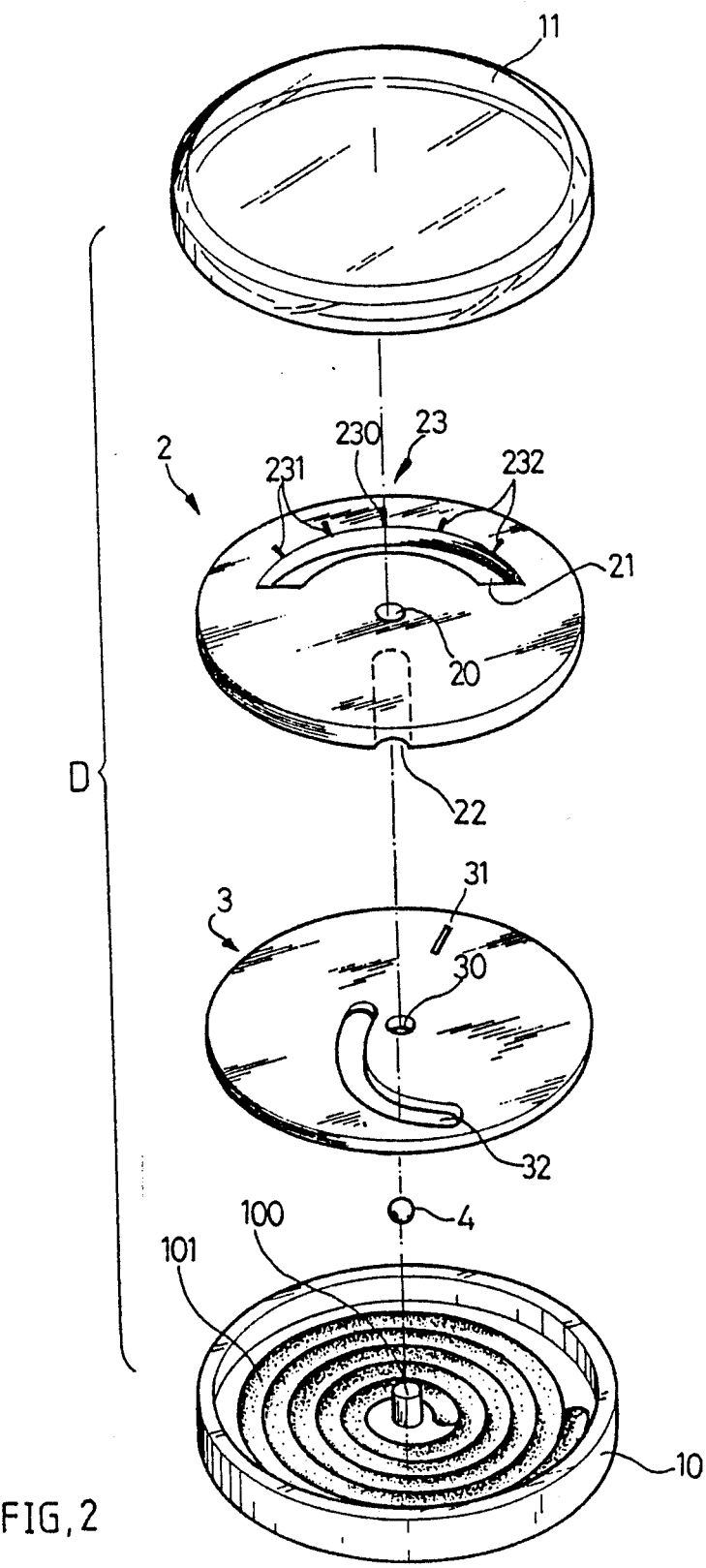
FIG. 2 is an exploded diagram of an embodiment of this invention.

FIG. 2 illustrates an embodiment of the indicator D of the present invention with an exploded view of the five components which form the indicator. The five pieces are a transparent cover 11, a bias-weighted member 2, a pointer member 3, a ball-shaped member 4 and a base 10. These components, except the ball-shaped member 4, are preferably made of plastics molded or pressed, so they may be inexpensively manufactured. The cover 11 and the base 10 are fixedly coupled to one another and contain the other components therein. The outside rim of the cover 11 and the base 10 may be circular as shown or any other shape. There is a stud 100 on the center of base 10 on which the bias-weighted member 2 pivots by way of hole 20. The base contains a spiral groove 101 around stud 100. The number of circles is not less than the number of possible revolutions of the steering wheel W. The bias-weighted member 2 is round-shaped and has a cut-away portion 21. Member 2 is biased in weight to maintain it in an upright position when pivoting with the hole 20 on the base 10 that is inclined. A radial groove 22 is furnished on member 2 and faces the groove 101 of base 10 so as to constrain the ball-shaped member 4 therein as it rolls when relative turning of the base 10 to the bias-weighted member 2 occurs. There is a scale 23 furnished on the member 2 for indicating the position of pointer member 3 that lays under the member 2. The scale 23 comprises a neutral mark 230 in the middle thereof and several other indicia 231, 232 on the left and right respectively that correspond to revolutions of the steering wheel. The pointer member 3 has a hole 30 for pivoting on stud 100 of the base 10, a pointer mark 31 that will be present in the cut-away portion 21 of the member 2 for referring to the scale 23 as an indication and a curved slot 32 that will cross the ball-shaped member 4 which is constrained by the radial groove 22 of the member 2 and the spiral groove 101 of the base 10 for converting the movement of the ball-shaped member 4 along the groove 22 by relative rotation between the member 2 and the base 10 into swing of the point member 3.

Figure 3:
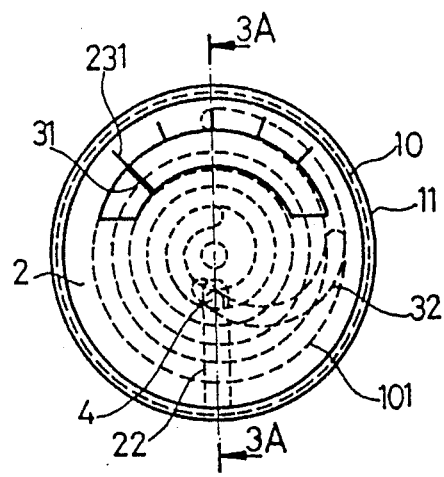
FIGS. 3, 4 and 5 respectively illustrate the swing of the pointer member that turns to left, maintains a neutral position and turns to right.
Figure 4:
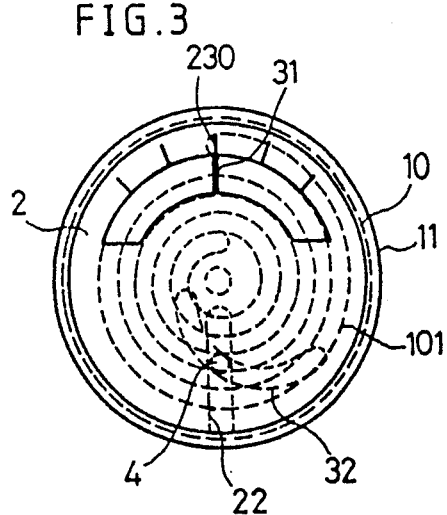
Figure 5:
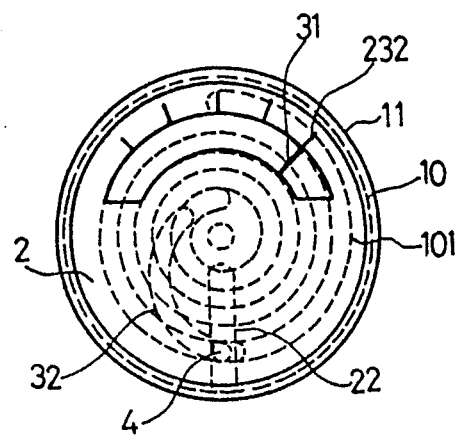

The aforesaid function will be illustrated with reference to FIGS. 3, 4, 5 and sectional view 3A. Each of these figures show that the bias-weighted member 2 maintains itself in an upright position because of gravity, while the relative rotation of the base 10 with the steering wheel W to the bias-weighted member 2 forces the ball-shaped member 4 to move along the radial groove 22 of the bias-weighted member 2 by constraint of the spiral groove 101 of the base 10. The pointer member 3 that is mounted between the bias-weighted member 2 and the base 10 and pivots on stud 100 has curved slot 32 through which ball-shaped member 4 passes. The movement of ball-shaped member 4 along the groove 22 activates the pointer member 3 with its pointer mark 31 turned to the left (FIG. 3), to neutral (FIG. 4) and to the right (FIG. 5) relative to the scale 23 and indicia 231, 230 and 232 respectively on the bias-weighted member 2. The movement of the ball-shaped member and of pointer member 3 corresponds to the turning direction of the car wheels (not shown) or the revolutions of the steering wheel W.

Figure 3A:
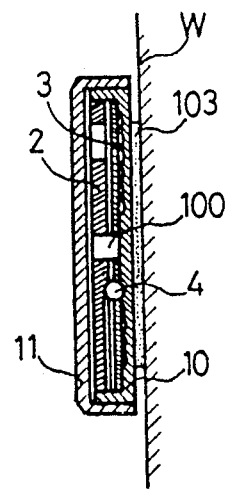
FIG. 3A is a sectional view taken along line A—A in FIG. 3.

There is an adhesive cushion 103, as shown in FIG. 3A, for fastening the base 10 to the steering wheel W. However, any manner of fixation can be used for this purpose. Moreover, the contour and assembly of these members may be other forms besides the one shown herein.

While the invention has been described in connection with what is presently considered to be the most practical and preferred embodiment, it is to be understood that the invention is not to be limited to the disclosed embodiment, but is intended to cover various modifications and equivalent arrangements included within the spirit and scope of the appended claims.

We claim:

1. An indicator mounted on a tilted steering wheel for indicating the turn condition of said steering wheel, comprising:
    a base member, fixed with respect to said steering wheel, having a spiral groove formed around a center portion thereof, a number of revolutions of said spiral groove are not less than a number of revolutions which the steering wheel can turn;
    a gravity-responsive member pivotally mounted on said base member at said center portion and biased in weight so as to maintain itself in an upright position;
    a radial groove formed on said gravity-responsive member facing said spiral groove of said base member;
    a ball shaped member confined between the radial groove and said spiral groove so as to move along said radial groove in an up-down movement upon rotation of said base member relative to said gravity responsive member; and
    a pointer member, located between said base member and said gravity-responsive member which pivots on the center portion of said base member, said pointer member furnished with a curved slot for said ball shaped member to pass through and convert said up-down movement of said ball-shaped member into a left-right swing of aid pointer member relative to said gravity responsive member, said swing corresponding to left/right turning of said steering wheel.

2. An indicator as in claim 1, wherein said pointer member includes a pointer portion for registering with indicia on a scale furnished on said gravity responsive member.

3. An indicator as in claim 1, further comprising a transparent cover fixedly coupled to said base member.

4. An indicator as in claim 2, further comprising a transparent cover fixedly coupled to said base member.

* * * * *